Patented Mar. 4, 1952

2,587,599

UNITED STATES PATENT OFFICE 2,587,599

CATALYTIC METAL-ALKALINE EARTH CARBONATE PELLET AND ITS PRODUCTION

Ben Bennett Corson and George Arthur Webb, Pittsburgh, Pa., assignors to Koppers Company, Inc., Pittsburgh, Pa., a corporation of Delaware No Drawing. Application August 27, 1945, Serial No. 613,036

14 Claims. (Cl. 252—443)

This invention relates to catalysts and their manufacture and has for its objects to provide new and useful processes for making hard catalysts; to provide new and useful hard catalysts; to avoid loss of strength in catalyst pellets during reduction; to avoid the disadvantages of the prior art and to obtain advantages as will become apparent. Other objects will become apparent as the description proceeds.

These objects are accomplished in the present invention by crystallizing in situ in a catalyst mass, preferably pelleted or otherwise formed, an alkaline earth metal carbonate. By crystallizing an alkaline earth metal carbonate in situ in the catalyst pellet, there is obtained a hard pellet which is uniquely characterized by a ground mass having an interlacing network of crystals of the alkaline earth metal carbonate.

More particularly, the objects of the invention are accomplished in this wise. Into a suitable catalyst mass, there is incorporated, preferably at least partially hydrated, an alkaline earth metal oxide. The mass is then heated, preferably after pelleting or otherwise forming, in an atmosphere containing carbon dioxide as required substantially to carbonate the alkaline earth metal oxide. Depending upon the nature of the catalyst and the purpose for which it is to be used, it may be used as such or further processed as, for example, by reduction or other methods of activating the catalyst.

Calcium hydroxide is most suitably employed as the alkaline earth metal oxide. It is of particular advantage in the process of the invention, especially where the catalyst mass is pelleted or otherwise formed, to use calcium hydroxide because it has substantially the same molecular volume as the calcium carbonate formed. A similar effect may be obtained with other alkaline earth metal oxides by so adjusting the amount of water that the hydrated alkaline earth metal oxide has a molecular volume substantially equivalent to that of the carbonate formed. Thus by mixing barium oxide or barium hydroxide and barium hydroxide octahydrate in suitable proportions, there may be obtained a hydrated barium oxide having a molecular volume substantially equivalent to the molecular volume of the barium carbonate formed. For example, mixtures of 14 parts barium hydroxide and one part barium hydroxide octahydrate, and 49 parts barium oxide and 9 parts barium hydroxide octahydrate, have a molecular volume substantially equal to that of barium carbonate.

The invention may be more fully understood by reference to the following examples in which the parts are by weight unless otherwise specified.

EXAMPLE 1

Commercial basic nickel carbonate - Celite-graphite pellets containing approximately 63% nickel, 33% Celite and 4% graphite on the reduced basis were heated in a stream of nitrogen at 425° C. for 36 hours and the resulting decarbonated pellets were ground to pass 20 mesh. This powder was mixed with an amount of calcium hydroxide to give a mixture containing 13.5% of calcium hydroxide and pelleted. The pellets thus obtained were heated in a stream of carbon dioxide at 425° C. for 93 hours at which time approximately 48% of the calcium hydroxide had been carbonated. The carbonated pellets were then heated in a stream of hydrogen at 425° C. for 12 hours.

To illustrate the effect of carbonation, uncarbonated pellets were also heated in a stream of hydrogen at 425° C. for 12 hours. The following table shows the peripheral crushing strength of the pellets at different stages in the process:

Table

| Pellet | Peripheral Crushing Strength (Average of ten tests) |
|---|---|
| | Pounds |
| Untreated pellets | 7.9 |
| Carbonated pellets | 13.1 |
| Carbonated and reduced pellets | 10.1 |
| Reduced pellets (uncarbonated) | 4.0 |

These data show that a substantial increase in the peripheral crushing strength of the pellets is obtained by crystallizing calcium carbonate in situ in the pellet. The high strength of the pellets produced according to the invention is of particular significance in view of the fact that a loss of strength of approximately 50% during the reduction is usual in the art. It is significant to note that the reduced carbontaed pellets according to the invention have 152% better strength than the reduced uncarbonated pellets.

This is shown more fully by the following data:

(a) A wet mixture of 19% precipitated calcium carbonate and 81% of the Celite-nickel carbonate catalyst was prepared and pelleted. These pellets had a peripheral crushing strength of 5.9 pounds as prepared and 1.4 pounds after reduction.

(b) A dry mixture of 17% finely divided limestone and 83% of the catalyst mix was prepared and pelleted. These pellets showed crushing strength of 7.3 pounds and 1.1 pounds before and after reduction, respectively.

(c) A mixture containing 19% calcium carbonate and 81% of the catalyst mix was made by co-precipitation, starting with nickel nitrate, calcium nitrate, Celite, and $Na_2CO_3$. This mixture was very difficult to pellet because the powder was too fluffy to feed into the die of the pellet machine. These pellets showed crushing strength of 12.7 pounds and 1.1 pounds, before and after reduction, respectively.

From these data, it is evident that in situ carbonate crystallization produces pellets of markedly superior crushing strength. It is also evident that the pellets so obtained are entirely different from those which result from the normal use of calcium carbonate or other carbonates as carriers or activators or promotors in the catalysts of the prior art.

The pellets according to the example are suitable for hydrogenation reactions such as hydrogenation of benzene. They are suitable at relatively high temperatures and if necessary, may periodically be recarbonated to accommodate any decarbonation which may result from excessively high temperature operation.

EXAMPLE 2

A mixture of 15% $Fe_2O_3$, 10% Celite and 75% calcium hydroxide and sufficient water to form a thick aqueous paste was forced into one-eighth inch diameter holes drilled in a three-sixteenth of an inch steel plate. The plate containing the paste was dried at 115° C. after which the dried pellets were pushed from the plate. The dried pellets were heated at 615° C. in a stream of carbon dioxide for 24 hours. The dried pellets (non-carbonated) had a peripheral crushing strength of 3 pounds with a percentage conversion of calcium hydroxide to carbonate of 31. The carbonated pellets had a peripheral crushing strength of 11 pounds and a percentage conversion of 93.

EXAMPLE 3

The process of Example 2 was repeated except that the calcium hydroxide and $Fe_2O_3$ was calcined at 850° C. for 12 hours in a stream of air prior to wet-mixing in order to produce carbon dioxide-free calcium hydroxide. Also the drying was effected in the absence of carbon dioxide to avoid carbonation. The dried pellets had a peripheral crushing strength of 4.5 pounds and a percentage conversion to carbonate of 11. The carbonated pellets had a peripheral crushing strength of 19 pounds and a percentage conversion of 78.

These data show that crystallizing calcium carbonate in situ produces catalysts of markedly superior peripheral crushing strength.

The catalysts produced according to Examples 2 and 3 are suitable for use as dehydrogenation catalysts. They are of particular advantage in such operations because the high strength of the catalyst can be maintained even at high temperatures by including carbon dioxide as a diluent in the vapors subjected to the dehydrogenation.

While the invention has been described with reference to particular embodiments, it will be understood that it is not limited thereof but that variations may be made therein without departing from the spirit and scope of the invention.

The proportions may be varied over a wide range depending upon the particular nature of the catalyst and the particular application. For example, as illustrated in Example 1, as little as 13% may be used effectively to strengthen the standard hydrogenation catalyst mixture. Whereas, as in Examples 2 and 3, as much as 75% of the catalyst may be made up of in situ carbonate. As these amounts are illustrative only, it will be understood that larger or small amounts, usually within the limits of 5% to 95% of in situ carbonate or hydrated alkaline earth metal oxide, may be used.

The carbonation is desirably effected in an atmosphere of carbon dioxide but may be effected in any carbonating atmosphere, that is to say, an atmosphere which, at the temperature of carbonation, has a pressure of carbon dioxide above the disassociation pressure of the carbonate at the temperature involved.

The temperature of carbonation may vary widely. It is of advantage, however, to use a temperature above the dehydration temperature of the hydrated alkaline earth metal oxide. At such temperature the dehydration which takes place simultaneously with the carbonation tends to increase the porosity of the pellets, a fact which appears materially to aid the formation of an interlacing network of in situ carbonate crystals. With calcium hydroxide it is thus desirable to use a temperature of at least about 600° C. Especially good results are thus obtained not only for the reasons noted above but also apparently because the type of calcium carbonate formed at this temperature (Calcite) has substantially the same molecular volume as calcium hydroxide. Temperatures up to about 900° C. are suitable. Higher temperatures may be used but at higher temperatures there is a likelihood that the efficiency of the catalyst will be impaired.

While Celite has been illustrated as a carrier or filler in the examples, it will be understood that this material may be omitted or may be replaced by other suitable carriers or fillers such as alumina, kieselguhr, carbon, asbestos, bauxite, bentonite, corundum, gypsum, zeolite, silicate, silica clay, pumice, titania, zirconia and chromia.

In place of reduced nickel hydrogenation catalysts and iron oxide dehydrogenation catalysts, there may be substituted other active catalytic materials such as platinum, palladium, chromia, copper oxide, zinc oxide, zinc chromate, vanadium pentoxide, silver oxide, cobalt oxide, thoria, zirconia, tantalum oxide, molybdenum oxide or sulfide, and the heavy metallates, i. e. tungstates, molybdates, etc.

We claim:

1. In the manufacture of a catalyst the steps of incorporating in a catalyst mass a catalyst and a hydrated alkaline earth metal oxide, forming the mass and heating it in a carbonating atmosphere at a temperature above the dehydration temperature of said hydrated alkaline earth metal oxide whereby the hydrated alkaline earth metal oxide is simultaneously dehydrated and carbonated.

2. In the manufacture of catalyst pellets the steps of incorporating calcium hydroxide and a catalyst in a catalyst mass, forming said mass, and heating the formed mass above the dehydration temperature of calcium hydroxide in a carbonating atmosphere whereby the calcium hydroxide is simultaneously dehydrated and carbonated.

3. The method of claim 2 in which the carbonation is effected at a temperature of 600° to 900° C.

4. In a manufacture of catalyst pellets the steps of incorporating from 5% to 95% of a calcium hydrate and a catalyst in a catalyst mass, pelleting the mass and heating the pellets in carbonating atmosphere at a temperature above the dehydration temperature of the calcium hydrate as required substantially to carbonate the hydrated alkaline earth metal oxide.

5. The method of claim 4 in which the carbonation is effected at a temperature of 600° to 900° C.

6. A catalyst pellet characterized by a reduced metal catalyst distributed in and chemically uncombined with a ground mass having an interlacing network of crystals of alkaline earth metal carbonate.

7. A catalyst pellet comprising a finely divided catalytic metal dispersed in and chemically uncombined with a ground mass having an interlacing network of crystals of alkaline earth metal carbonate.

8. A catalyst pellet characterized by a reduced metal catalyst distributed in and chemically uncombined with a ground mass having an interlacing network of crystals of calcium carbonate.

9. A catalyst pellet comprising a finely divided catalytic metal dispersed in and chemically uncombined with a ground mass having an interlacing network of crystals of calcium carbonate.

10. In the manufacture of catalyst pellets, the steps of preparing a catalyst mass containing a reducible compound of a catalytic metal, incorporating therein from 5 to 95% of a calcium hydrate, pelleting the mass while the calcium oxide and water is substantially in the same ratio as in calcium hydroxide, heating the mass in a carbonating atmosphere as required to effect substantial carbonation and dehydration of the mass, and heating the carbonated pellets in a reducing atmosphere as required substantially to reduce said compound to the metallic state.

11. The process of claim 10 in which the carbonating step is carried out at a temperature above the dehydration temperature of calcium hydroxide whereby uncarbonated hydroxide is dehydrated.

12. A catalyst pellet comprising a catalyst dispersed in a ground mass having an interlacing network of crystals of calcium carbonate extending inwardly from the surface of the pellet over a substantial portion of the cross sectional area thereof, said catalyst being a finely divided reduced metal uncombined chemically with said ground mass.

13. In the manufacture of a catalyst, the steps of pelleting a catalyst mass in a dry state free of non-chemically combined water, said mass comprising a reducible compound of a catalytic metal, from 5 to 95 per cent calcium hydroxide, and the balance inert diluent, heating the pelleted mass in a carbonating atmosphere as required to effect substantial carbonation of the calcium hydroxide, and thereafter reducing said reducible compound in situ in said carbonated catalyst mass.

14. In the manufacture of a catalyst, the steps of pelleting a catalyst mass in a dry state free of uncombined water, said mass comprising a reducible compound of a catalytic metal, from 5 to 95 per cent hydrated alkaline earth metal oxide and an amount of combined water such that the molecular volume of the hydrated alkaline earth metal oxide is substantially the same as that of the carbonate, heating the pelleted mass in a carbonating atmosphere as required to effect substantial carbonation of the hydrated alkaline earth metal oxide, and thereafter reducing said reducible compound in situ in said carbonated catalyst mass.

BEN BENNETT CORSON.
GEORGE ARTHUR WEBB.

REFERENCES CITED

The following references are of record in the file of this patent:

UNITED STATES PATENTS

| Number | Name | Date |
| --- | --- | --- |
| 899,581 | Weiss | Sept. 29, 1908 |
| 1,604,576 | Mathers et al. | Oct. 26, 1926 |
| 1,732,409 | Loomis et al. | Oct. 22, 1929 |
| 1,853,771 | Larson | Apr. 12, 1932 |
| 1,970,695 | Freyermuth | Aug. 21, 1934 |
| 2,005,412 | Connolly et al. | June 18, 1935 |
| 2,197,707 | Crittenden | Apr. 16, 1940 |
| 2,300,878 | Drennan et al. | Nov. 3, 1942 |

OTHER REFERENCES

Stillman "Briquetting," Chem. Pub. Co., 1923, pgs. 132, 133, 381, and 394. (Copy in Div. 64.)

Mellor, Inorganic & Theoretical Chemistry, vol. 3, Longmans, pp. 655, 677, 682, 817, 835 and 836. (Copy in Div. 59.)